United States Patent
Kramer et al.

(10) Patent No.: US 7,850,567 B2
(45) Date of Patent: Dec. 14, 2010

(54) DIFFERENTIAL CARRIER WITH AN INNER PLATE PACKAGE

(75) Inventors: Fred Kramer, Wachtberg (DE); Adrian Chludek, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 681 days.

(21) Appl. No.: 10/581,734

(22) PCT Filed: Dec. 20, 2003

(86) PCT No.: PCT/EP03/14687

§ 371 (c)(1),
(2), (4) Date: Mar. 5, 2007

(87) PCT Pub. No.: WO2005/064206

PCT Pub. Date: Jul. 14, 2005

(65) Prior Publication Data

US 2007/0259750 A1  Nov. 8, 2007

(51) Int. Cl.
F16H 48/20 (2006.01)

(52) U.S. Cl. .................. 475/231; 192/70.12; 192/70.23

(58) Field of Classification Search ................ 475/160, 475/231
See application file for complete search history.

(56) References Cited

U.S. PATENT DOCUMENTS

| 3,429,400 A | * | 2/1969 | Engle et al. ................ 184/11.1 |
| 3,523,467 A | | 8/1970 | Shachter |
| 3,741,343 A | | 6/1973 | Lindenfeld et al. |
| 4,625,585 A | | 12/1986 | Dissett |
| 4,757,727 A | * | 7/1988 | Teraoka et al. ................ 475/85 |
| 5,080,640 A | * | 1/1992 | Botterill ..................... 475/231 |
| 5,279,401 A | | 1/1994 | Stall |
| 6,379,277 B1 | * | 4/2002 | Victoria et al. ............... 475/231 |
| 6,460,677 B1 | * | 10/2002 | Roscoe ........................ 192/84.7 |
| 6,561,939 B1 | * | 5/2003 | Knapke ....................... 475/150 |
| 6,692,396 B1 | * | 2/2004 | Grogg et al. .................. 475/86 |
| 6,837,821 B2 | * | 1/2005 | Teraoka et al. .............. 475/231 |
| 6,945,898 B2 | * | 9/2005 | Szuba ........................ 475/230 |
| 7,357,748 B2 | * | 4/2008 | Kelley, Jr. ................... 475/231 |

FOREIGN PATENT DOCUMENTS

| DE | 34 02 917 | | 2/1985 |
| DE | 34 02 918 | | 2/1985 |
| DE | 41 35 739 | | 3/1992 |
| DE | 41 35 755 | | 3/1992 |
| DE | 43 30 581 | | 3/1994 |
| JP | 61062640 | | 3/1986 |
| JP | 61062640 A | * | 3/1986 |
| JP | 3-217331 | | 9/1991 |
| JP | 5 221 250 A | | 8/1993 |
| JP | 11 270 654 A | | 10/1999 |

* cited by examiner

*Primary Examiner*—David D Le
*Assistant Examiner*—Justin Holmes
(74) *Attorney, Agent, or Firm*—Rader, Fishman & Grauer, PLLC

(57) ABSTRACT

A differential drive with a rotatably arranged differential carrier (11) in which a multi-plate coupling (23) is arranged so as to be effective between the differential carrier (11) and a sideshaft gear (29), wherein the differential carrier (11) includes a dish-shaped carrier part (12) in which there are received sideshaft gears (28, 29) and differential gears (26, 27). The differential carrier includes a dish-shaped cover (14) which receives the plates of the multi-plate coupling (23).

13 Claims, 3 Drawing Sheets

DIFFERENTIAL CARRIER WITH AN INNER PLATE PACKAGE

TECHNICAL FIELD

The invention relates to a differential drive with a rotatably arranged differential carrier in which a multi-plate coupling is inserted so as to be effective between the differential carrier and a sideshaft gear.

BACKGROUND

Such multi-plate couplings are used in lockable differential drives wherein, by actuating the multi-plate coupling, there is built up a locking moment between the differential carrier and one of the sideshaft gears and thus, also indirectly, between the sideshaft gears, so that a torque introduced into the differential carrier is effectively built up at both sideshafts gears even in those cases where there is no counter moment at one of the sideshaft gears. Differential drives of said type are used in motor vehicles in the form of axle differentials between the driving wheels of a driving axle or as central differentials between two driving axles. In the case of prior art differential carriers, the space needed for the multi-plate coupling requires a very deep carrier part which is difficult to machine.

SUMMARY OF THE INVENTION

The object of the present invention provides an improved differential drive whose differential carrier does not feature the existing disadvantages and which has advantageous effects.

In particular, the differential carrier comprises a dish-shaped carrier part in which there are received sideshaft gears and differential gears, and the differential carrier comprises a dish-shaped cover attached thereto which receives the plates of the multi-plate coupling. This solution achieves the required axial depth in the cover of the differential carrier, which depth is needed for the plate package of the multi-plate coupling, so that the carrier part is axially shorter and thus stiffer, while, at the same time, the cover, due to its dish shape, can take over additional functions. The dish shape of the carrier part and cover means that each is provided with a base and a casing and, for inter-connection purposes, flange portions can be provided at the aperture end. The flange portions at the two carrier parts required for fixing a driving ring gear are now positioned more centrally with reference to the longitudinal extension of the parts, so that, with reference to the bearings of the differential carrier, the introduction of power is more advantageous.

According to one embodiment of the invention, in the sense of rotation, the outer plates of the multi-plate coupling are form-fittingly held in the cover and, in the sense of rotation, the inner plates of the multi-plate coupling are form-fittingly held on a hub connected to a sideshaft gear. This means that there is no need for any intermediate carriers or the like for the multi-plate coupling and that it is possible to pre-assemble the multi-plate coupling in the cover with the inserted coupling hub and side gear, and, finally, the carrier part can be placed on to said pre-assembled unit in which the other sideshaft gear and the differential gears can be securely held by the bearing journal for the differential gears. The assembly procedure for the entire differential carrier is thus substantially simplified.

Furthermore, according to another embodiment, on the outside of the cover, there is arranged a sleeve which axially supports an actuator for the locking coupling; the actuator can also be radially supported on the sleeve, provided it is not supported in a contact-free way relative to the sleeve in the differential housing.

For improving the cooling of the multi-plate coupling, it is possible to provide the cover with apertures through which any oil contained in the differential housing can constantly flow towards the coupling plates. Furthermore, the apertures can be associated with blades with a centripetal effect on the oil in the differential housing, which blades, when the differential carrier rotates, scoop up oil from the outside on to the multi-plate coupling. The blades are adapted to the preferred direction of rotation of the differential carrier, which direction corresponds to the forward driving direction of the motor vehicle comprising the differential drive.

BRIEF DESCRIPTION OF THE DRAWINGS

A preferred embodiment of the invention is illustrated in the drawings and will be described below.

DETAILED DESCRIPTION

Figure 1:
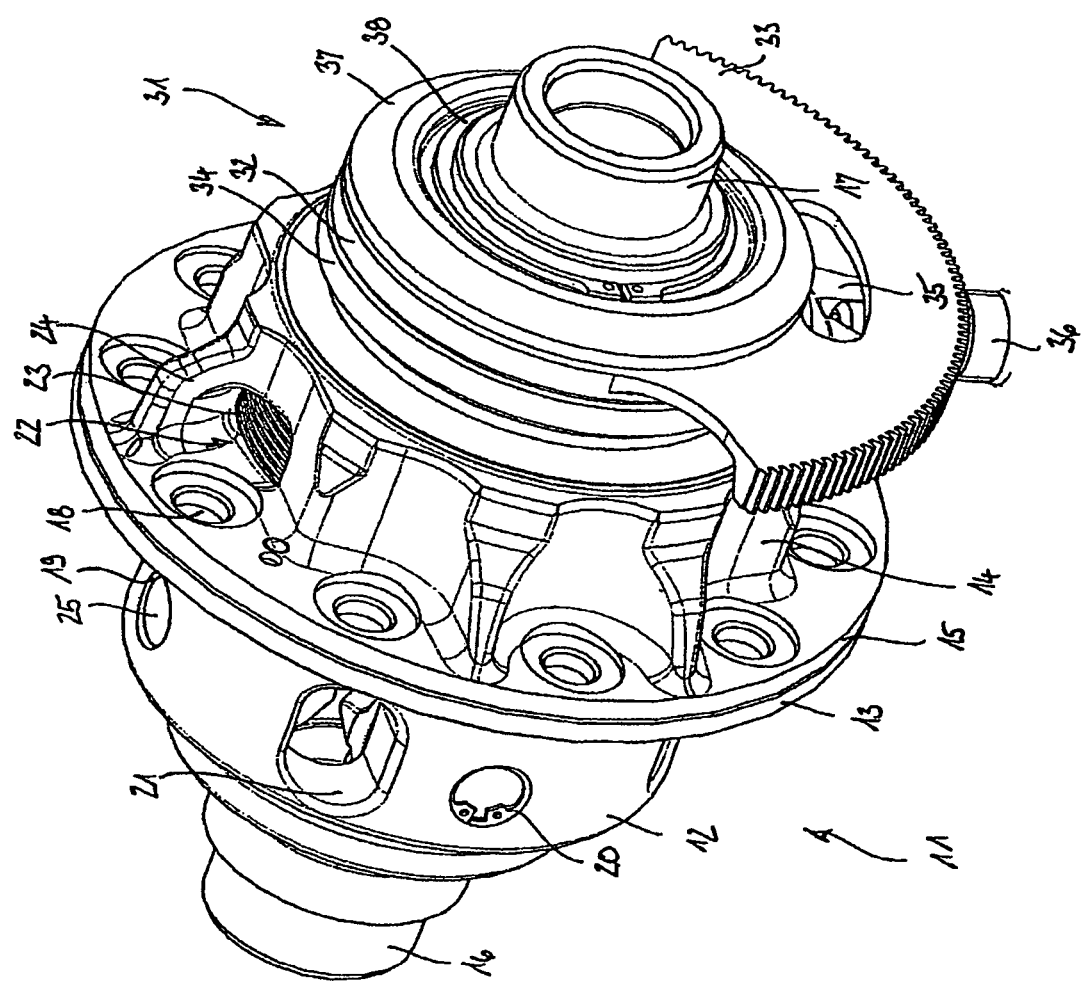
FIG. 1 shows an inventive differential carrier in a perspective view.

FIG. 1 shows a differential carrier 11 which, substantially, consists of a carrier part 12 with a formed-on flange 13 and of a cover part 14 with a formed-on flange 15. A first bearing sleeve 16 on to which it is possible to slip a rolling contact bearing is formed on to the carrier part 12. A second bearing sleeve 17 on to which it is possible to slip a second rolling contact bearing is formed on to the cover 14. The rolling contact bearings are used to rotatably support the differential carrier in a drive housing (not illustrated). The flanges 13, 15 are shown to comprise through-bores 18 by means of which the parts 12, 14 of the differential carrier can be bolted together, and a ring gear (not shown) for rotatingly driving the differential carrier can be bolted to the flanges. The carrier part is shown to comprise first bores 19 into which there are inserted journals 25 for differential gears, which journals 25 are secured by securing rings 20. Furthermore, there are shown second apertures 21 which allow the supply of oil to the interior of the differential carrier.

The cover part 14 is provided with apertures 22 through which it can be seen that a plate package 23 is arranged inside the cover 14. Scooping wings or blades 24 are associated with the apertures; when the differential carrier rotates, said blades 24 are used to supply oil on to the outside of the plate package 23. An actuator 31 is arranged coaxially relative to the cover 14 and, substantially, comprises a rotatingly drivable setting disc 32 with a tooth segment 33 and an axially displaceable pressure disc 34 which, by a claw 35, is held in a rotationally fast way relative to a journal 36 fixed in the housing. The setting disc 32 is axially supported against a supporting disc 37 which, by means of a securing ring 38, is fixed to a largely covered sleeve inside the actuator. The actuator 31 is arranged so as to be in a stationary condition relative to the housing (not illustrated), whereas the differential carrier 11 is normally permanently driven so as to rotate.

Figure 2:
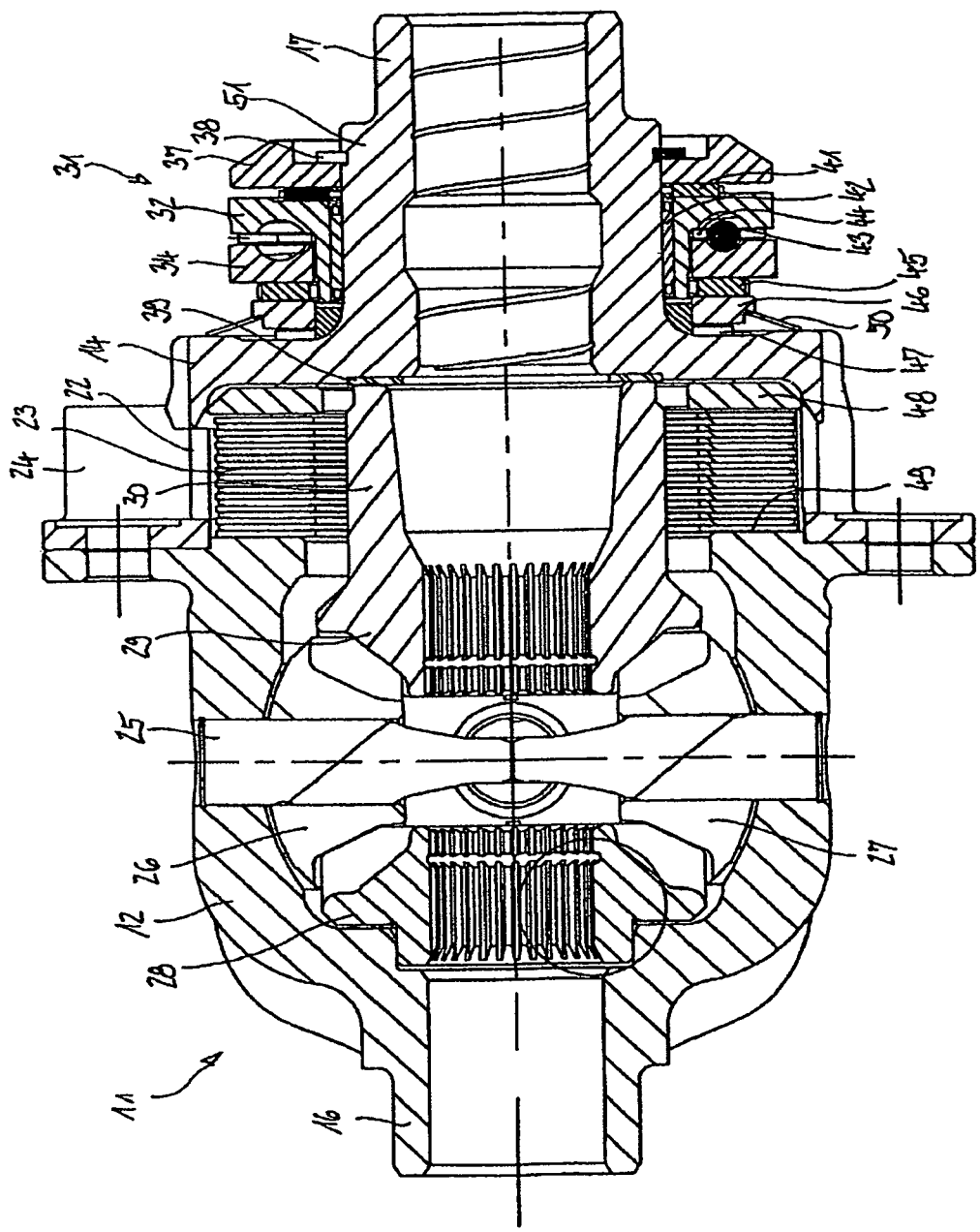
FIG. 2 shows a differential carrier according to FIG. 1 in a longitudinal section.

In FIG. 2, any details identical to those shown in FIG. 1 have been given the same reference numbers. To that extent, reference is made to the description of same. As far as details are concerned, it can be seen that into the carrier part 12 there have been inserted journals 25 which intersect one another and on which there are supported differential gears 26, 27. The differential gears 26, 27 engage sideshaft gears 28, 29. A first sideshaft gear 28 is slidingly supported in the carrier part 12, whereas a second sideshaft gear 29 is guided substantially self-centeringly between the differential gears 26, 27. The latter sideshaft gear 29 is produced so as to be integral with a coupling hub 30 and carries the inner plates of the plate package 23. The outer plates of the plate package 23 are form-fittingly held in the cover 14 which is shown in section in the region of the blades 24 and the apertures 23. Between the cover 14 and the hub 30 a supporting disc 39 can be identified. The actuator 31 is shown to comprise further details in addition to the rotatingly drivable setting disc 32, the pressure disc 34 being held so as to be rotationally fast and the supporting disc 37 being axially secured by the securing ring 38; said further details being an axial bearing 41 between the setting disc 32 and the supporting disc 37, a radial bearing 42 via which the setting disc 32 is supported on a sleeve 51 and balls 43 running in pairs of ball grooves in the discs 32, 34. A plurality of balls 43 is circumferentially distributed in a cage 44 and held at identical distances. As is known the depth of the ball grooves (not individually identified) in the opposing surfaces of the discs varies around the circumference, so that, when the setting disc 32 is rotated relative to the pressure disc 34, the balls run from the deeper groove regions into she shallower groove regions. Thereby, the pressure disc 34 held so as to be non-rotatable, pushes itself axially away from the setting disc 32. Via a further axial needle bearing 45 and a first pressure plate 46, the inner pressure disc 48 is pressure-loaded and axially displaced by journals 47 which axially pass through the cover 14. Said inner pressure disc 48 pushes together the plate package 23 which is supported on an annular face 49 of the carrier part 12. When the setting disc 32 is returned, the pressure plate 46 is pushed pack via a plate spring 50, so that the load is removed from the plate package 23. By closing the plate package, there is built up a locking moment between the sideshaft gears 28, 29.

Figure 3:
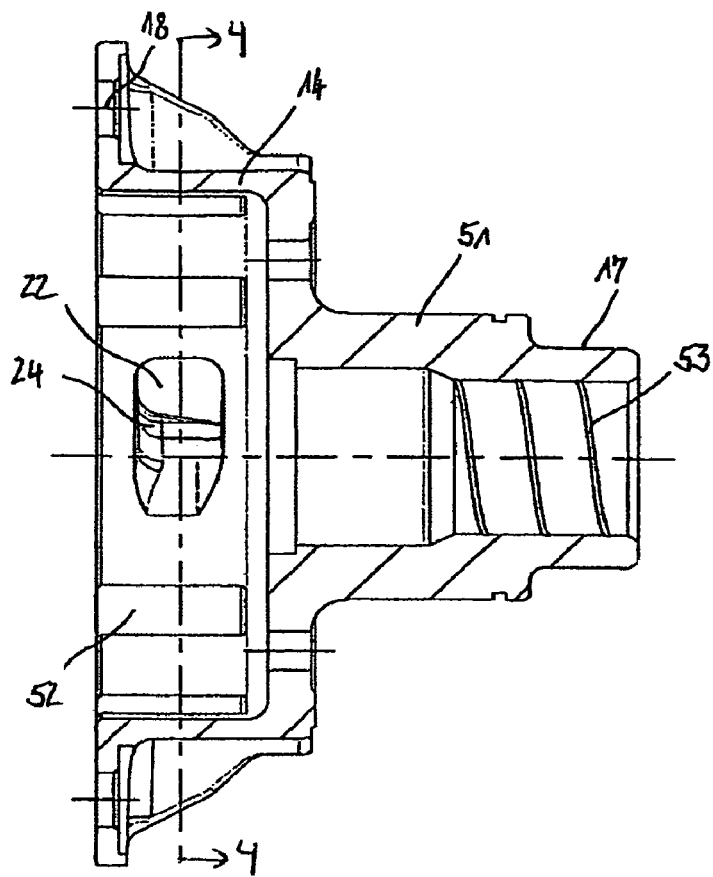
FIG. 3 shows a cover of the differential carrier according to an embodiment of the invention in a longitudinal section.

FIG. 3 shows the cover according to FIG. 2 in a slightly modified form as a detail. Any details identical those shown in FIG. 2 have been given the same reference numbers. Inside the cover 14, there are circumferentially distributed longitudinal grooves 52 which can be engaged in a form-fitting way by projections provided at the outer plates of the plate package 23. Inside the sleeve 17 it is possible to identify a lubricating groove 53. It can be seen more easily that the blades 24 are associated with the apertures 22.

Figure 4:
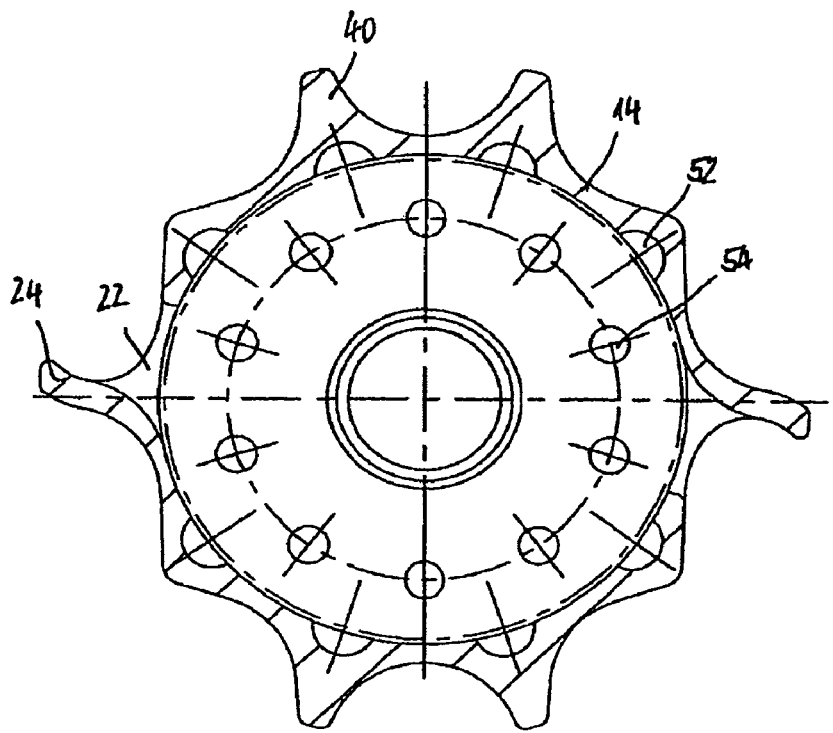
FIG. 4 shows the cover in a cross-section according to the sectional line 4-4 in FIG. 3.

In FIG. 4, any details identical to those shown in FIGS. 2 and 3 have been given the same reference numbers. The cover 14 is provided with longitudinal grooves 52 to allow a form-fitting and positive engagement of the outer plates of the plate package 23, and with axial through-holes 54 into which the above-mentioned journals 47 are inserted. It is also possible to see in detail the shape and functioning of the blades 24 in cooperation with the apertures 22 which assumes a clockwise movement of the cover 14. In addition to the blades, it is possible to see cooling ribs 40 which at the same time reinforce the cover 14.

The cover 14 shown in FIGS. 3 and 4, together with the plate package shown in FIG. 2 and the sideshaft gear 29, can be removed and replaced by a second sideshaft gear symmetrical to the sideshaft gear 28 and by a substantially flat cover in order to obtain—starting from the same dish part 12—an open differential which is not separate.

Differential Carrier with an Inner Plate Package

List of Reference Numbers
- 11 multi-plate coupling
- 12 dish part
- 13 flange
- 14 cover part
- 15 flange
- 16 bearing sleeve
- 17 bearing sleeve
- 18 bolt hole
- 19 through-hole
- 20 securing ring
- 21 aperture
- 22 aperture
- 23 plate package
- 24 blade
- 25 journal
- 26 differential gear
- 27 differential gear
- 28 sideshaft gear
- 29 sideshaft gear
- 30 coupling hub
- 31 actuator
- 32 setting disc
- 33 tooth segment
- 34 pressure disc
- 35 claw
- 36 journal
- 37 supporting disc
- 38 securing ring
- 39 disc
- 40 cooling rib
- 41 axial bearing
- 42 axial bearing
- 43 ball
- 44 ball cage
- 45 axial bearing
- 46 pressure disc
- 47 journal
- 48 pressure disc
- 49 supporting face
- 50 plate spring
- 51 sleeve

The invention claimed is:

1. A differential drive with a rotatably arranged differential carrier in which a first sideshaft gear and a second sideshaft gear are arranged, wherein a multi-plate coupling is arranged so as to be effective between the differential carrier and the second sideshaft gear, said multi-plate coupling comprising a hub and a plate package, said hub of said multi-plate coupling being produced so as to be integral with said second sideshaft gear, the differential carrier comprising a dish-shaped carrier part in which there are received the first and second sideshaft gears and differential gears, and a dish-shaped cover which receives the plate package of the multi-plate coupling, and an actuator for actuating the multi-plate coupling, wherein the plate package of the multi-plate coupling is axially supported against the dish-shaped carrier part, and the actuator is supported outside of the dish-shaped carrier cover, wherein the dish-shaped carrier part and the dish-shaped cover each comprise a connecting portion arranged so as to oppose one another to inter-connect the carrier part with the cover such that the carrier part and cover are oriented to extend away from each other at the connecting portions, wherein the cover, on its circumference, comprises apertures and blades, and wherein the blades are associated with the apertures and have a centripetal effect on a surrounding medium.

2. A differential according to claim 1, wherein, in the sense of rotation, outer plates of the multi-plate coupling are form-fittingly held in the cover and, in the sense of rotation, inner plates of the multi-plate coupling are form-fittingly held on a hub connected to one of the sideshaft gears.

3. A differential according to claim 1, wherein the cover comprises axial bores in which there are positioned axially movable journals for transmitting an axial movement from the actuator to the multi-plate coupling.

4. A differential according to claim 1, wherein the second sideshaft gear is guided self-centringly between the differential gears.

5. A differential according to claim 1, wherein the carrier part, in the region of the connecting portion, comprises an axial opening, wherein the size of the opening is such that the second sideshaft gear can be introduced into the carrier part through said opening.

6. A differential according to claim 1, wherein the second sideshaft gear is axially supported against the dish-shaped cover of the multi-plate coupling.

7. A differential according to claim 1 comprising a sleeve arranged on an outside of the cover which axially supports the actuator for the multi-plate coupling.

8. A differential according to claim 7, wherein the actuator is radially supported on the sleeve.

9. A differential drive with a rotatably arranged differential carrier in which a first sideshaft gear and a second sideshaft gear are arranged, wherein a multi-plate coupling is arranged so as to be effective between the differential carrier and the second sideshaft gear, said multi-plate coupling comprising a hub and a plate package, said hub of said multi-plate coupling being produced so as to be integral with said second sideshaft gear, the differential carrier comprising:

a dish-shaped carrier part in which there are received the first and second sideshaft gears and differential gears, and a dish-shaped cover which receives the plates of the multi-plate coupling, wherein the plate package of the multi-plate coupling is axially supported against the dish-shaped carrier part, wherein the carrier part and the cover each comprise a base portion, a casing portion and a connecting portion for interconnecting the carrier part with the cover, wherein the carrier part and the cover are connected such that the base portions are arranged on opposite sides with regard to said connecting portions, and wherein the differential drive further comprises a sleeve arranged on an outside of the cover which sleeve axially supports an actuator for the multi-plate coupling.

10. A differential according to claim 9, wherein the cover comprises axial bores in which there are positioned axially movable journals for transmitting an axial movement from an actuator to the multi-plate coupling.

11. A differential according to claim 9, wherein the second sideshaft gear is guided self-centringly between the differential gears.

12. A differential according to claim 9, wherein the carrier part, in the region of the connecting portion, comprises an axial opening, wherein the size of the opening is such that the second sideshaft gear can be introduced into the carrier part through said opening.

13. A differential according to claim 9, wherein the second sideshaft gear is axially supported against the dish-shaped cover of the multi-plate coupling.

* * * * *